United States Patent
Foser (10) Patent No.: US 9,113,741 B2
(45) Date of Patent: Aug. 25, 2015

(54) APPARATUS AND METHOD FOR COOKING PORTIONED FOOD PIECES IN BATCHES

(75) Inventor: Bruno Foser, Balzers (LI)

(73) Assignee: Arrola AG, Balzers (LI)

( * ) Notice: Subject to any disclaimer, the term of this patent is extended or adjusted under 35 U.S.C. 154(b) by 356 days.

(21) Appl. No.: 12/938,097

(22) Filed: Nov. 2, 2010

(65) Prior Publication Data

US 2011/0104349 A1    May 5, 2011

(30) Foreign Application Priority Data

Nov. 3, 2009   (EP) .................................... 09174920

(51) Int. Cl.
*A47J 27/00* (2006.01)
*A23L 1/01* (2006.01)
*A47J 27/18* (2006.01)

(52) U.S. Cl.
CPC ............ *A47J 27/18* (2013.01); *A47J 2027/008* (2013.01)

(58) Field of Classification Search
CPC ............................ A47J 27/18; A47J 2027/008
USPC ............ 426/509; 99/352, 407, 410, 330, 403, 99/355, 331
See application file for complete search history.

(56) References Cited

U.S. PATENT DOCUMENTS

| | | | | |
|---|---|---|---|---|
| 4,543,878 A | * | 10/1985 | Luchetti | 99/330 |
| 4,869,160 A | * | 9/1989 | Pratolongo | 99/330 |
| 5,142,966 A | * | 9/1992 | Morandi et al. | 99/352 |
| 5,422,976 A | * | 6/1995 | Knepler | 392/451 |
| 5,630,359 A | | 5/1997 | Stein | |
| 6,176,174 B1 | * | 1/2001 | Stein | 99/407 |
| 7,001,637 B2 | * | 2/2006 | Cusenza et al. | 426/510 |
| 2009/0090247 A1 | * | 4/2009 | Saltini | 99/352 |

FOREIGN PATENT DOCUMENTS

| | | |
|---|---|---|
| EP | 0 729 312 B1 | 1/1998 |
| EP | 0 952 781 | 11/1999 |
| GB | 2402204 A * | 12/2004 |
| IT | 1 207 735 B | 5/1989 |

* cited by examiner

*Primary Examiner* — Jianying Atkisson
(74) *Attorney, Agent, or Firm* — Muncy, Geissler, Olds & Lowe, P.C.

(57) ABSTRACT

An apparatus and method for cooking portioned food pieces in batches are disclosed. The apparatus comprises a cooking chamber for cooking the food pieces and a water removal chamber, beneath the cooking chamber, having a wastewater outlet, for discharging hot wastewater from the water removal chamber. A heating chamber is arranged around the cooking chamber, with a heating unit being arranged between the heating chamber and cooking chamber. A fresh water tank is connected to the heating chamber in order to fill the heating chamber with fresh water, and the heating chamber is connected to the cooking chamber to fill the cooking chamber with preheated fresh water. A wastewater tank is connected to the wastewater outlet. The wastewater tank and the fresh water tank are configured such that the fresh water in the fresh water tank is preheated by the hot wastewater in the wastewater tank.

15 Claims, 1 Drawing Sheet

APPARATUS AND METHOD FOR COOKING PORTIONED FOOD PIECES IN BATCHES

This application claims priority to European Patent Application No. 09174920.0, which was filed in the EPO on Nov. 3, 2009, and which is herein incorporated by reference in its' entirety.

The invention relates to an apparatus for cooking portioned food pieces, in particular pasta, noodles, rice, vegetables and pieces of meat and fish, in batches, according to the preamble of Claim 1, and also relates to a corresponding method according to the preamble of Claim 13.

An apparatus of this kind and a method of this kind are described, in particular, in EP 0 729 312.

Various embodiments of apparatuses for preparing portioned food pieces, in particular pasta, in batches are known from the prior art. Said apparatuses serve to prepare a portioned quantity of uncooked food pieces in the shortest possible time and are used primarily in the form of automatic machines.

EP 0 729 312 and EP 0 952 781 describe an apparatus for preparing portioned pasta, in particular spaghetti, in batches, having a storage container for accommodating uncooked pasta, a cooking chamber and a water removal chamber, it being possible to in each case close the inlet region and the outlet region of the cooking chamber and the water removal chamber by valves. In this apparatus, a closing flap which can be moved linearly transverse to the inlet or outlet direction is provided as the valve in the outlet region of the water removal chamber, with a valve being arranged in the outlet region of the cooking chamber and in the inlet region of the water removal chamber. After the predefined quantity of pasta, which is located above the cooking chamber, has been filled into the cooking chamber, of which the outlet region is closed, by means of a portioning apparatus, the cooking chamber, of which the lower region is already closed, is closed with the aid of a closing flap which can be moved linearly. Fresh water is admitted into a storage container from a fresh water supply means via a line and an open shut-off valve. From said storage container, the water enters the heating chamber, which surrounds the cooking chamber in the manner of an annular gap, by means of a pump via a line. A heating element in the form of heating rods is arranged in the intermediate wall between the cooking chamber and the heating chamber. Before the actual heating process begins, the entire heating chamber is filled with water and, furthermore, a predefined quantity of water is filled into the cooking chamber via a filling line. After the desired filling level within the cooking chamber is reached, a shut-off valve in the filling line is closed, so that the cooking chamber is thermally closed. A closing flap serves this purpose in the outlet region of said cooking chamber. The excess pressure prevailing in the cooking chamber after the actual cooking process is reduced by opening the shut-off valve by means of a pressure relief line which, at one end, is connected to a wastewater line, which ends in a wastewater discharge means, via a shut-off valve and, at the other end, is connected to the water removal chamber via a shut-off valve and a line. The cooking chamber and the water removal chamber are now at approximately the same pressure level. After the shut-off valve is closed, the closing flap can be opened and the cooked pasta falls into the water removal chamber together with the remaining cooking water. A strainer which is provided in the base region of the water removal chamber forms the passage to a line. A wastewater pump ensures that water is removed from the pasta present in the water removal chamber. In this case, the strainer has the effect that the pasta does not leave the water removal chamber. At the same time, the excess pressure still present in the water removal chamber is reduced. Hot steam passes from the water removal chamber, through a preheating line, into the storage container and there additionally slightly warms the fresh water which is to be heated by the heating rods later. The preheating line ends in the wastewater discharge means. After the pasta has been separated from the cooking water, the ready portion of pasta can be dispensed onto a plate or the like, which is located beneath the water removal chamber, by means of the closing flap which can be moved linearly.

The described apparatus and the described method have long been used successfully in practice, in particular for preparing spaghetti and macaroni. The preparation interval for each portion of noodles is approximately 120 to over 150 seconds in the standby state in the case of the known apparatus, with the heating of the noodles in the water in the cooking chamber requiring approximately 90 to 120 seconds and filling of the empty cooking chamber with the noodles, emptying of the cooking chamber, removal of water from the cooked noodles, rinsing of the apparatus and opening and closing of the valves requiring approximately 30 seconds. In order to allow the most rapid possible heating of the water in the heating chamber and the cooking chamber, a high-power heating element with a power consumption of approximately 6000 watts is used, this requiring a high-voltage current connection to 360 volts and a fuse of 20 to 32 amperes.

U.S. Pat. No. 4,543,878 discloses an apparatus for cooking of food items, in particular, pasta, dehydrated vegetables or the like. The apparatus comprises a hot water generator, a cooking chamber combined with it, a food inlet entering the cooking chamber and a separating chamber following the cooking chamber through an outlet. The separating chamber is located under the cooking chamber, so that the cooked food items drop into the separating chamber following the completion of the cooking process. The cooking chamber, the hot water generator connected with it and the separating chamber form a coherent, compact unit. A pump is provided, which maintains the water in the hot water generator at a predetermined excess pressure. This water is initially conducted through heat exchangers which are traversed in a counter current manner by the steam derived from the cooking chamber and the separating chamber. The water supplied to the hot water generator by the pump is preheated, using the residual energy of the steam or hot water released from the separating chamber and the cooking chamber. However, if no hot steam or hot water is released from the separating chamber and the cooking chamber, for example when the apparatus has not been used for a certain period of time, the water supplied to the hot water generator is not preheated. Cold water has to be heated in the hot water generator. Consequently, the coming-up time of this apparatus is very long.

The objective is to further reduce the coming-up time of the machine and the preparation time. This is desirable, in particular, at peak times, for example at the beginning of the lunch break, when a large number of portions of noodles are to be prepared within the shortest possible time. Under certain circumstances, this would be possible by using an even more powerful heating element. However, the use of an even more powerful heating element for achieving an even shorter heating time would further increase the peak power consumption.

The use of a heating element with an even higher power is sometimes not even possible on the basis of the existing infrastructure. In many places, a high-voltage current connection is not available, and therefore the use of heating elements with even greater power consumption is rejected in principle. A further objective is to reduce the peak power consumption of the apparatus to below 3500 watts, so that operation of the apparatus using a conventional domestic power connection, in particular using a normal 230 volt socket fused with a maximum of 16 amperes, is possible.

In order to permit rapid preparation of the noodles, it appears to be necessary to provide a relatively large quantity of hot water in the heating chamber, so that the heating time for the water is reduced or it is not even necessary to heat the water when a portion of noodles is ordered, since the water is already at the desired temperature. However, the provision of a relatively large quantity of hot water in the heating chamber leads, in turn, to a relatively high power consumption in the standby state, even if no noodles are being prepared. However, the intention is to reduce the power consumption in the ready-to-operate standby state. In addition, increasing the quantity of hot water to be provided also leads to the heating time being increased when the cold appliance is switched on.

The requirements for a relatively short preparation time, in particular at peak times, a relatively low peak power consumption and a reduced standby power consumption therefore create a conflict of objectives which it has not been possible to adequately resolve to date.

The object of the invention is therefore to provide an apparatus and a method for cooking portioned food pieces, in particular pasta, noodles, rice, vegetables and pieces of meat and fish, in batches, which apparatus and method are distinguished by a shortened preparation interval together with reduced energy consumption, in particular reduced peak power consumption.

This object is achieved by realizing the features of the independent claims. Features which develop the invention in alternative or advantageous ways can be gathered from the dependent claims.

The invention is based on the basic idea of largely recovering the thermal energy expended by preparing the portion of food pieces and to utilize it for preparing the next portion. The major proportion of the energy consumed by the machine is created by heating the cold fresh water. After the portion of food pieces is prepared and water is removed from the cooked food pieces, a significant proportion of this thermal energy has, to date, been discharged to the sewage system in the form of hot wastewater or steam or to the surrounding area in the form of steam. Only a relatively low proportion of less than 20% of the water is absorbed during cooking of the food pieces, depending on the type of food pieces. The excessive proportion of water required to prepare a portion of food pieces has, to date, been discharged without being used. The wastewater and the discharged steam are at a significantly higher temperature than the supplied fresh water. Experiments have shown that the temperature of the wastewater in the case of preparing food pieces by boiling is approximately 85 to 100 degrees Celsius, while the fresh water drawn from the fresh water line is at temperatures of 10 to 25 degrees Celsius.

The invention is based on the concept of producing a thermodynamic equilibrium between the water which is supplied to the apparatus or to the method and the wastewater and the steam which are discharged from the apparatus or the method. The temperature difference between the fresh water and the wastewater, which difference can be up to 80 degrees, is used by the wastewater which is produced during preparation and the produced steam being completely captured as far as possible and heat being exchanged between the captured hot wastewater and steam and the fresh water which is provided for preparing the next portions. This recovery of energy leads primarily to significantly less energy having to be introduced into the system, and therefore allows the energy consumption for operation of the apparatus and for carrying out the method to be considerably reduced, in the case of regular operation and removal of a relatively large number of portions continuously at short intervals. The overall energy balance during operation of the apparatus according to the invention over a relatively long period of time is significantly better than in the case of the known apparatuses in which no or only little use is made of the thermal energy of the wastewater or of the expelled steam. Since, primarily at peak times at which a relatively large quantity of portions has to be prepared within a relatively short time, a relatively large quantity of hot wastewater is also continuously produced and the proportion of recoverable thermal energy increases on account of shorter cooling times, the heating time is significantly reduced and a significantly smaller heating element can even be used for heating the fresh water which has already been preheated. Therefore, a high-power heating element can be dispensed with, as a result of which the maximum power consumption of the appliance drops to well below 3500 watts and operation using the normal domestic power supply system is possible.

Experiments have shown that a turbocharger-like effect is created by the heat recovery system according to the invention since the fresh water temperature also increases as the number of portions drawn one after the other increases, as a result of which both the heating time and the electrical energy required for preparing a portion fall. On account of the preparation intervals which become increasingly shorter, the fresh water temperature increases to a limit value.

The invention comprises an apparatus for cooking portioned food pieces in batches. Food pieces are generally understood to include food in the form of pieces which are prepared by means of cooking in water, steam, an aqueous solution or some other liquid, in particular a broth, a sauce, a juice or a fat, preferably for consumption shortly afterward. The food pieces are prepared with an excess amount of liquid, with some of the liquid being discharged after the cooking process, in particular in the form of excess cooking water, and not being intended for consumption. Suitable food pieces include, in particular, pasta, such as noodles in the form of spaghetti, macaroni or tortellini, such as gnocchi or spaetzle, rice, vegetables which can be cooked or fruits which can be cooked, and also pieces of meat, including pieces of poultry, and pieces of fish. The size of the pieces can vary.

Cooking is generally understood to mean a wet cooking technique for preparing food by supplying heat with the aid of liquid, in particular water. Cooking is understood to mean both boiling and simmering, that is to say cooking in water in the region of the boiling point, simmering or cooking at low temperatures, that is to say cooking in water at a temperature considerably below boiling point, pressure-cooking, that is to say cooking or steaming under excess pressure and therefore at a boiling point higher than atmospheric pressure, and also steaming or poaching, that is to say cooking in steam.

Within the scope of the invention, water, in particular fresh water, is to be understood not only as pure water but also enriched or aromatized water and aqueous solutions, in particular including broths, stocks, sauces, juices or fats.

The apparatus according to the invention comprises a storage container for accommodating the uncooked food pieces which are to be cooked. The food pieces stored the storage container can be completely raw and uncooked and have no appreciable water content. However, it is also possible to use precooked and/or water-containing food pieces. This may be advantageous in particular for preserving the food pieces and/or for shortening the preparation time. Within the scope of the invention, uncooked food pieces are therefore generally understood to mean food pieces which are supplied to the apparatus and to the method and are to be cooked or cooked further.

The storage container has an associated portioning apparatus for removing a specific or specifiable portion of uncooked food pieces from the storage container. A portion is generally understood to mean a defined quantity of food pieces, in particular a defined partial quantity of the total quantity stored in the storage container. The defined quantity may be, for example, a volume, piece or weight range. The portion can comprise a fixed or variable quantity. By way of example, a portion is a quantity of food pieces which fits in a container of a specific, fixed or variable size.

The apparatus has a cooking chamber for cooking the portion of uncooked food pieces which is removed from the storage container by means of the portioning apparatus. The cooking chamber, which can be closed in a pressure-tight manner and is preferably designed to accommodate an excess pressure, in particular of over 1 bar, and which has, in particular, a tubular, for example cylindrical or conical, basic shape which extends substantially vertically, has an upper cooking chamber inlet which can be closed by means of a first closure, in particular a first valve. The cooking chamber can be charged with the portion of uncooked food pieces via the upper cooking chamber inlet at the upper end of the cooking chamber. In other words, the portioning apparatus is arranged in such a way that the portion of uncooked food pieces can be transferred from the storage container, via the upper cooking chamber inlet, into the cooking chamber. A lower cooking chamber outlet, which can be closed by means of a second closure, in particular a second valve, is located at the lower end of the cooking chamber. This lower cooking chamber outlet serves to dispense the portion of cooked food pieces. The heating chamber has at least one associated heating unit by means of which the contents of the cooking chamber can be heated for cooking purposes.

A water removal chamber is located beneath the cooking chamber. The cooking chamber can be connected to the water removal chamber via the cooking chamber outlet by opening the second closure which is located at the lower end of the cooking chamber, so that the portion of food pieces which are cooked in the cooking chamber can fall into the water removal chamber when the second closure is opened. In other words, the cooking chamber and the water removal chamber can be connected to one another via the closable cooking chamber outlet. The water removal chamber serves to remove water from the portion of cooked food pieces, it being possible for the cooked food pieces to be separated from the excess hot water which has been used for cooking purposes in the cooking chamber by allowing said water to drain off. This excess water is designated wastewater in the text which follows.

A wastewater outlet is arranged in the base of the water removal chamber. The wastewater outlet is formed, for example, by an opening in the base of the water removal chamber or a pipe or a hose which ends in the base of the water removal chamber. This wastewater outlet is preferably, depending on the geometry of the cooked food pieces, provided with a strainer so that only the excess hot wastewater but not a significant proportion of cooked food pieces is discharged from the water removal chamber through the wastewater outlet. The water removal chamber has, for example, a cylindrical, truncated-cone-like or spherical shape, in particular with a larger cross section than that of the cooking chamber, so that the excess hot wastewater can drain effectively from the food pieces and be discharged through the wastewater outlet. In particular, the cooking chamber and the water removal chamber form a common pressure space when the second closure is open and when the remaining closures and valves are in their closed positions.

A lower water removal chamber outlet is integrally formed at the bottom of the water removal chamber, it being possible for this lower water removal chamber outlet to be closed by means of a third closure, in particular a third valve. The water removal chamber outlet serves to dispense the portion of cooked food pieces, from which water has been removed, after the wastewater has been discharged. The cooked food pieces from which water has been removed can, for example, fall onto a plate, into a bowl or onto a conveyor belt via the opened water removal chamber outlet.

In the described apparatus, the food pieces are transferred from the cooking chamber into the water removal chamber and from there are dispensed, mainly by gravity. However, as an alternative, it is also possible to actively convey the food pieces, for example by means of a conveyor belt, a slide or by virtue of excess pressure or vacuum.

In one possible embodiment, the first closure of the upper cooking chamber inlet and the third closure of the lower water removal chamber outlet can be formed by closing flaps which can be moved linearly at a distance from the respective chamber wall which contains the respective opening in the chamber, so that the closing flaps are pressed perpendicularly onto the opening plane of the respective chamber for closing at the end of the linear movement, in particular by means of a lever mechanism. The second closure at the lower cooking chamber outlet between the cooking chamber and the water removal chamber is, for example, in the form of a pivotable closing flap which is closed and locked by means of a linear drive and a lever mechanism, in particular by means of a toggle lever mechanism. The compression is effected in particular by means of a lever mechanism, so that the drive power both for the linear movement and for the lever movement can be set extremely low. This results in a very expedient overall height of the valves of the apparatus, so that the overall height of the apparatus is so low that the machines equipped with the apparatus can be handled with comfort. The use of a lever mechanism, in particular a toggle lever mechanism, can be advantageous since a drive motor of relatively small dimensions can be used and the high pressures of a few bar occurring in the cooking chamber during the cooking process do not affect the motor on account of the lever construction. A closure of this kind is known from the prior art and is described, for example, in EP 0 729 312. However, as an alternative, it is also possible to use other types of closure for the first, second, or third closure, for example slide valves, flap valves, ball valves, cycling valves, transfer valves or other suitable valves or closures.

The apparatus also has a heating chamber for preheating fresh water. The heating chamber has at least one associated heating unit, so that the fresh water can be preheated in the heating chamber. This heating chamber can be arranged separately from the cooking chamber, with the heating chamber and the cooking chamber each having at least one dedicated heating unit. As an alternative, the heating chamber and the cooking chamber are connected to one another and share, in particular, at least one common heating unit. In one possible embodiment of the invention, the heating chamber is arranged all around the cooking chamber. At least one heating unit for heating the contents of the cooking chamber and the contents of the heating chamber is located in the partition wall between the heating chamber and the cooking chamber. In other words, the heating chamber surrounds the cooking chamber in the manner of an annular gap, with the heating unit, in particular in the form of heating rods, being arranged in the intermediate wall between the cooking chamber and the heating chamber. The heating chamber is preferably closed in a pressure-tight manner, so that an excess pressure, in particular of over 1 bar, can be produced in the heating chamber. In terms of function, the heating chamber is to be understood to mean a chamber for preheating the water which is to be used for cooking in the cooking chamber. It is possible for the heating chamber to be formed by the cooking chamber, so that the cooking chamber is also the heating chamber at the same time. Therefore, the invention also comprises an embodiment in which the cooking chamber and the heating chamber form a common cooking chamber.

The apparatus according to the invention has a fresh water tank for accommodating fresh water. This fresh water tank is preferably connected to the fresh water supply system for refilling the fresh water tank or it serves as a refillable water reservoir. The fresh water tank is of such a size that at least the quantity of fresh water in the fresh water tank which is required to prepare a portion of food pieces can be accommodated.

The fresh water tank is connected to the heating chamber in order to fill said heating chamber with fresh water. This connection is established, for example, via a line, in particular with the aid of a switchable fresh water pump and/or a valve. As an alternative, the fresh water is forced from the fresh water tank into the heating chamber by gravity and/or by virtue of the water pressure from the line of the fresh water supply system.

The heating chamber is, in turn, connected to the cooking chamber in order to fill said cooking chamber with preheated fresh water. This connection is established, for example, via at least one line and/or a hole in the wall between the heating chamber and the cooking chamber, it being possible, in particular, for the connection to be closed by means of a valve. The cooking chamber can be filled with the preheated fresh water from the heating chamber, for example, by virtue of excess pressure in the heating chamber, which is closed in a pressure-tight manner, and/or by a pump and/or by gravity.

According to the invention, the apparatus has a wastewater tank. This wastewater tank is connected to the hot wastewater outlet of the water removal chamber and is designed to accommodate the hot wastewater from the water removal chamber. In other words, preferably all, the hot wastewater from the water removal chamber is captured in the wastewater tank.

The volume of the wastewater tank is of such a magnitude that at least the wastewater from the water removal chamber which is produced during the preparation of a portion of food pieces can be accommodated in the wastewater tank. The quantity of wastewater which is produced during the preparation of a portion of food pieces is somewhat smaller than the quantity of fresh water required for the preparation of a portion of food pieces since the cooked food pieces absorb some of the water as they are prepared in the cooking chamber, and also some of the water remains adhering to the food pieces during the water removal process in the water removal chamber and is dispensed together with the cooked food pieces from which water has been removed.

According to the invention, the wastewater tank and the fresh water tank adjoin one another in such a way that the fresh water in the fresh water tank is preheated by the hot wastewater in the wastewater tank. In other words, the fresh water tank and the wastewater tank are thermally connected to one another in such a way that heat is exchanged between the hot wastewater, emanating from the water removal chamber, in the wastewater tank and the cooler fresh water in the fresh water tank, and the warmer wastewater heats the cooler fresh water so that, after a specific time, a thermodynamic equilibrium is produced between the wastewater in the wastewater tank and the fresh water in the fresh water tank by virtue of corresponding temperature compensation. This recovery of energy leads to it being possible for the fresh water from the fresh water tank to be conveyed to the heating chamber having already been preheated, so that less energy is required to heat the water in the heating chamber to the predefined setpoint temperature. Therefore, primarily, significantly less energy has to be introduced into the system in the case of regular operation and removal of a relatively large number of portions continuously at short intervals. The energy consumption for operating the apparatus and carrying out the method can be considerably reduced.

In order that the fresh water in the fresh water tank, which fresh water is required for preparing a portion, can be preheated by the hot wastewater, the volume of the fresh water tank preferably corresponds at least to the volume of fresh water which is sufficient for preparing at least one portion of food pieces. The volume of the wastewater tank is preferably greater than the volume of the fresh water tank, with, in particular, the volume of the heating chamber being greater than the volume of the cooking chamber. Energy can be recovered very efficiently using these volume ratios. However, as an alternative, it is also possible to choose other volume ratios.

In order to allow heat exchange between the hot wastewater and the cooler fresh water, it is advantageous for the wastewater tank and the fresh water tank to directly adjoin one another and preferably be separated only by a common partition wall, so that wastewater and fresh water are directly adjacent. The wastewater tank preferably surrounds the fresh water tank at least in one plane, or vice versa. By way of example, the wastewater tank is arranged all around the fresh water tank, or vice versa. It has proven advantageous for the fresh water tank to be arranged in the wastewater tank. In this case, the fresh water tank is substantially completely surrounded by the wastewater tank. As an alternative, an inverted arrangement is possible. According to the invention, it is also possible to nest or interleave the wastewater tank and the fresh water tank in such a way that two regions are provided in a common tank, said regions, in terms of function, forming the wastewater tank and the fresh water tank, with a boundary surface which is as large as possible being created between these two regions. This is possible, for example, by means of a tank which has a honeycomb structure in the interior, with the individual hexagonal segments being alternately connected to one another and therefore alternately containing relatively hot wastewater and relatively cold fresh water.

In a development of the invention, a fresh water heating element, for example an immersion heater-like heating coil, is provided in the fresh water tank for additionally preheating the fresh water. This additional preheating of the fresh water in the fresh water tank is advantageous primarily when the quantity of hot wastewater in the wastewater tank or the temperature of the wastewater in the wastewater tank is not sufficient for adequately preheating the fresh water in the fresh water tank or the apparatus has already been started or is restarted. This fresh water heating element can even be active when the apparatus is turned off or is in stand-by, and when the heating chamber is inactive. When the machine is restarted, preheated hot water is provided by the fresh water tank. The preheated hot water can be pumped into the heating chamber so that the cold heating chamber is preheated by this hot water. This speeds up the heating time of the water in the heating chamber. Consequently, the apparatus warm-up time is essentially reduced since preheated hot water is always provided by the fresh water tank. In a development of the invention, the fresh water tank is surrounded by the wastewater tank. If there is no hot or warm wastewater in the wastewater tank, the wastewater tank will be drained. The air in the wastewater tank surrounding the fresh water tank has a insolating effect, so that the preheated hot water in the fresh water tank will be insulated by the surrounding warm air in the wastewater tank.

In a development of the invention, a wastewater filling level measuring device for detecting the quantity of wastewater in the wastewater tank is provided, the said wastewater filling level measuring device being connected to a switchable wastewater tank outlet, in particular a wastewater pump, for switchably expelling the wastewater from the wastewater tank. The wastewater filling level measuring device may be a floating switch which expels all or some of the wastewater from the wastewater tank when a filling level limit value is reached. As an alternative, said wastewater filling level measuring device is a sensor by means of which the level in the wastewater tank can be determined. In addition, a fresh water filling level measuring device for detecting the quantity of fresh water in the fresh water tank is provided. This fresh water filling level measuring device is operatively connected to a fresh water tank inlet, in particular a fresh water valve, in such a way that the fresh water can be admitted into the fresh water tank in a switchable manner. By way of example, the fresh water filling level measuring device may be a floating switch which fills the fresh water tank with fresh water up to a specific limit value when a minimum level is reached. As an alternative, the fresh water filling level measuring device is a sensor by means of which the level in the fresh water tank can be determined. In a development, the wastewater filling level measuring device, the wastewater tank outlet, the fresh water filling level measuring device and the fresh water tank inlet are interconnected in such a way, in particular via an electronic control system, that the quantity of fresh water in the fresh water tank is dependent on the quantity of wastewater in the wastewater tank. Therefore, it is possible, in particular, for the filling level of fresh water in the fresh water tank and the filing level of wastewater in the wastewater tank to be kept at substantially the same level, so that the wastewater and the fresh water each border one another at the same filling level. If a substantially different level prevails in the two tanks, for example because significantly more wastewater is stored in the wastewater tank than in the fresh water tank, there is a risk, for example, of a large proportion of the heat from the hot wastewater being dissipated to the air in the fresh water tank at the boundary surface between the wastewater tank and the fresh water tank. In this situation, it is expedient to fill the fresh water tank in such a way that the hot wastewater in the wastewater tank is completely surrounded by the fresh water. In other words, it is advantageous for the control system to be designed in such a way that the level of fresh water in the fresh water tank corresponds at least to the level of wastewater in the wastewater tank.

A further development of the invention makes provision for a wastewater temperature measuring device for detecting the temperature of the wastewater to be provided in the wastewater tank. The wastewater tank has a switchable wastewater tank outlet, in particular a wastewater pump, for switchably expelling the wastewater from the wastewater tank. A fresh water filling level measuring device is provided for detecting the quantity of fresh water in the fresh water tank. The fresh water tank has a fresh water tank inlet, in particular a fresh water valve, for switchably admitting fresh water into the fresh water tank. The wastewater temperature measuring device, the wastewater tank outlet, the fresh water filling level measuring device and the fresh water tank inlet are interconnected in such a way, in particular via an electronic control system, that the quantity of fresh water in the fresh water tank is dependent on the wastewater temperature in the wastewater tank. This development of the invention can also be combined with the preceding development of the invention. It is also possible, in addition or as an alternative to detecting the fresh water level using the fresh water filling level measuring device, to detect the fresh water temperature in the fresh water tank by means of a fresh water temperature measuring device. It is therefore possible to determine the thermal energy of the wastewater and, in particular, also the thermal energy of the fresh water in the respective tank by detecting the quantity and the temperature and to control the filling level in such a way that heat can be exchanged in an optimum manner. Therefore, it is expedient, for example, to completely empty the wastewater tank when the temperature of the wastewater has fallen to the same level as the temperature in the fresh water tank or even lower. It is also expedient, for certain applications, to control the filling level in a deliberate manner in order to achieve a short preheating time by, for example, the fresh water tank deliberately being kept at a low filling level, so that the low quantity of fresh water assumes a higher preheating temperature, as a result of which the heating time can be reduced. To this end, it is advantageous for the quantity of fresh water in the fresh water tank to increase as the quantity of wastewater increases and/or as the wastewater temperature increases.

In a development of the invention, a fresh water heating element for preheating the fresh water is arranged in the fresh water tank, with the fresh water heating element and the wastewater tank outlet being interconnected in such a way that the quantity of wastewater in the wastewater tank is reduced, in particular there is substantially no wastewater in the wastewater tank, when the fresh water heating element is switched on. This has the effect that the fresh water heating element primarily heats the fresh water but not the wastewater in the wastewater tank which adjoins the fresh water tank. The fresh water heating element is activated preferably when the wastewater in the wastewater tank is not significantly warmer than the fresh water in the fresh water tank and when the temperature of the fresh water in the fresh water tank has fallen below a specific limit value. To this end, the wastewater temperature measuring device, the fresh water temperature measuring device, the wastewater tank outlet and the fresh water heating element are interconnected in such a way that the fresh water heating element is switched on when a temperature of the fresh water in the fresh water tank is undershot and/or when a temperature of the wastewater in the wastewater tank is undershot, and the wastewater is expelled from the wastewater tank by means of the wastewater tank outlet when the fresh water heating element is switched on.

In a further embodiment of the invention, the water removal chamber has, in particular in an upper section, a water removal chamber pressure outlet. Any possible pressure in the water removal chamber, in particular in the form of steam, can therefore be expelled before the third closure of the water removal chamber outlet is opened. The water removal chamber pressure outlet is connected to the wastewater tank and/or to the wastewater line, in particular via a valve. Pressure which is present in the water removal chamber, in particular in the form of steam, therefore enters the wastewater tank and heats it such that the fresh water in the fresh water tank is heated too.

In addition or as an alternative, the heating chamber has a heating chamber pressure outlet which is connected to the wastewater tank and/or to the wastewater line, in particular via a valve, so that pressure, in particular in the form of steam, can be expelled from the heating chamber into the wastewater tank. The valve is preferably interconnected to a pressure sensor, which detects the pressure in the heating chamber, in such a way that the pressure in the heating chamber is limited, in particular regulated.

Likewise in addition or as an alternative, the cooking chamber has a cooking chamber pressure outlet which is connected to the wastewater tank and/or to the wastewater line, in particular via a valve. The pressure, in particular in the form of steam, can be expelled from the cooking chamber into the wastewater tank by means of the cooking chamber pressure outlet. In one development, the valve is interconnected to a pressure sensor, which detects the pressure in the cooking chamber, in such a way that the pressure in the cooking chamber is limited, in particular regulated.

Since not only the hot wastewater, which is produced during operation of the apparatus, but also any steam and excess pressure is received in the wastewater tank, the greatest possible amount of thermal energy which leaks in the form of water and steam can be recovered.

The wastewater tank can either be vented, so that pressure compensation with the surrounding area takes place, in particular via a filter, or said wastewater tank can be designed as a tank which is closed in a gas-tight manner, with the excess pressure in the wastewater tank being limited, in particular regulated, and being expelled via the wastewater outlet and/or an additional pressure outlet. In order to ensure that the pressure is not recirculated from the wastewater tank to the wastewater chamber, the cooking chamber or the heating chamber, it is possible to use non-return valves and pumps, in particular between the water removal chamber and the wastewater tank.

The fresh water tank may be in the form of an open, vented tank. As an alternative, it is possible for the fresh water tank to be a pressure-tight tank. This has the advantage, in particular, that the pressure of the fresh water supply system can be used to force the fresh water from the fresh water tank into the heating chamber.

A development of the invention makes provision for a water collection tray to be arranged beneath the cooking chamber, the heating chamber, the water removal chamber, the fresh water tank and the wastewater tank. A water collection tray filling level measuring device is provided in order to detect a quantity of water in the water collection tray. A main valve is located in the supply means for the fresh water to the fresh water tank. The water collection tray filling level measuring device and the main valve are formed and interconnected in such a way that the supply means for fresh water is switched off when a limit value for the quantity of water in the water collection tray is exceeded. By way of example, the water collection tray filling level measuring device is in the form of a floating switch and the main valve is in the form of a solenoid valve which is electrically connected to the water collection tray filling level measuring device. By means of this arrangement, it is possible to switch off the supply means for fresh water in the event of a leak in a component, in order to prevent water from escaping in an undesirable manner, and the associated possible water damage.

In a further embodiment, a quenching nozzle for quenching the portion of cooked food pieces, from which water may have been removed, with fresh water is arranged in the water removal chamber. This is particularly advantageous when preparing noodles, in order to be able to quench the cooked noodles with cold fresh water. The quenching nozzle is, for example, a spray nozzle. The quenching nozzle is connected to the fresh water supply means, which is connected upstream of the fresh water tank, via a quenching nozzle valve, so that fresh water which has not been preheated is used for quenching.

The method according to the invention for cooking portioned food pieces, in particular pasta, noodles, rice, vegetables and pieces of meat and fish, in batches, in particular using the apparatus according to the invention as just described above, will be explained in summary and in general in the text which follows.

The fresh water tank is filled with a quantity of fresh water, which is sufficient for preparing at least one portion of food pieces, by activating the switchable fresh water tank inlet. The heating chamber, which is arranged all around the cooking chamber in particular, is then filled with fresh water from the fresh water tank. Then, as a function of the remaining quantity of fresh water in the fresh water tank, said fresh water tank is, in particular, refilled by activating the switchable fresh water tank inlet. The heating chamber is heated in order to heat the fresh water located in it. The temperature and/or the pressure in the heating chamber are preferably limited or regulated. It is possible to regulate the water temperature at far above 100 degrees Celsius by generating an excess pressure, for example of up to 5 bar. The heating unit, which is arranged in a partition wall between the heating chamber and the cooking chamber, is, for example, provided for heating purposes. In a following step, a portion of uncooked food pieces is removed from the storage container by means of a portioning apparatus. The cooking chamber is charged with the portion of uncooked food pieces via the open first closure of the upper cooking chamber inlet of the cooking chamber by means of the portioning apparatus, with the lower cooking chamber outlet being closed by means of the second closure. After the cooking chamber is charged with the portion of uncooked food pieces, the first closure of the upper cooking chamber inlet is closed. The cooking chamber, which is preferably closed in a gas-tight manner, is filled with preheated fresh water from the heating chamber. The portion of uncooked food pieces is now located in the preheated fresh water for cooking purposes. In a following step, it is necessary to wait until the portion of uncooked food pieces in the cooking chamber is cooked, with heat preferably being supplied continuously or at intervals by means of the heating unit or another heating unit. The temperature and/or the pressure in the cooking chamber are preferably limited or regulated, for example at a pressure of up to 2 bar. In an optional step, the pressure between the cooking chamber and the water removal chamber is compensated during or after cooking. After the end of the cooking process, the second closure is opened, with the portion of cooked food pieces falling from the cooking chamber, through the lower cooking chamber outlet, into the water removal chamber which is arranged beneath the cooking chamber, with the lower water removal chamber outlet being closed by means of the third closure. In a next step, water is removed from the portion of cooked food pieces by discharging hot wastewater from the water removal chamber by virtue of the excess water in the water removal chamber draining off from the cooked food pieces and being discharged from the water removal chamber. The wastewater is at a temperature of up to 100 degrees, depending on the temperature and the pressure in the cooking chamber. In a further step before, during or after water removal and discharge of the waste water, the cooked food pieces, from which water has been removed, in the water removal chamber are optionally quenched by introducing fresh water into the water removal chamber, in particular by spraying by means of a nozzle, and discharging the wastewater from the water removal chamber. The portion of cooked food pieces, from which water has been removed and which may be quenched, is then dispensed by opening the third closure, with the portion of cooked food pieces, from which water has been removed and which may be quenched, falling through the lower water removal chamber outlet, in particular onto a plate, into a bowl or onto a conveyor belt. According to the invention, the hot wastewater is routed out of the water removal chamber into the wastewater tank, with the volume of the wastewater tank being of such a magnitude that at least the wastewater from the water removal chamber which is produced during the preparation of a portion of food pieces is accommodated in the wastewater tank. The fresh water in the fresh water tank is preheated by the wastewater in the wastewater tank, which adjoins the fresh water tank, and in particular by a fresh water heating element. In a development, the quantity of fresh water in the fresh water tank is regulated or controlled depending on the quantity of wastewater and/or the temperature of the wastewater in the wastewater tank. In a development, the quantity of fresh water in the fresh water tank increases as the quantity of wastewater increases and/or as the temperature of the wastewater increases. In a further development, pressure prevailing in the water removal chamber and/or in the cooking chamber and/or in the heating chamber is released into the wastewater tank. The order of the described steps can vary. Therefore, it is possible, for example, to fill the cooking chamber with the portion of uncooked food pieces in a first step and to only then heat the fresh water. Further variations, provided they are logical and expedient, are possible.

The apparatus according to the invention and the method according to the invention will be described, purely by way of example, in greater detail below with reference to a specific exemplary embodiment, which is schematically illustrated in a drawing, with further advantages of the invention also being discussed.

Figure 1:
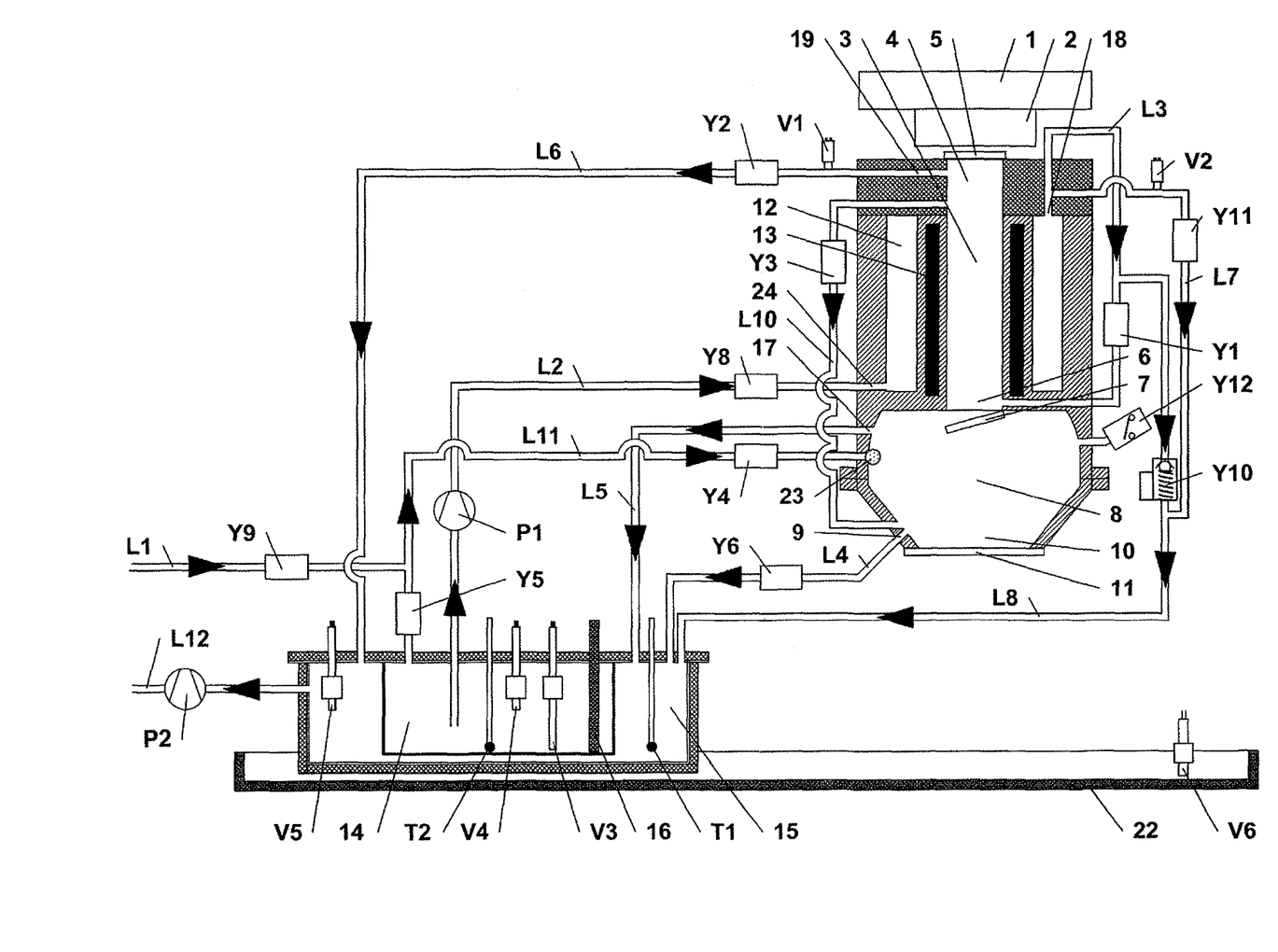
FIG. 1 is a schematic illustration of the manner of operation of the apparatus according to the invention.

Specifically:

FIG. 1 is a schematic illustration of an exemplary embodiment of the apparatus according to the invention, not drawn to scale. The apparatus and the method will be described in the text which follows with reference to this schematic illustration of the specific exemplary embodiment.

The apparatus for cooking portioned food pieces, in particular pasta, noodles, rice, vegetables and pieces of meat and fish, in batches is composed essentially of a storage container 1, a portioning apparatus 2, a cooking chamber 3, a water removal chamber 8, a heating chamber 12, a fresh water tank 14 and a wastewater tank 15. The storage container 1 contains the uncooked food pieces to be cooked. A portion of uncooked food pieces can be removed from the storage container 1 and passed to the cooking chamber 3 for cooking the portion of uncooked food pieces via an upper cooking chamber inlet 4 by means of the portioning apparatus 2. The round cooking chamber inlet 4 can be closed by means of a first closure 5 which is formed by a closing flap which can be moved linearly. The cooking chamber 3 has a cylindrical cross section and extends vertically. A round lower cooking chamber outlet 6 which can be closed by means of a second closure 7, specifically a pivotable closing flap, is located at the bottom of the cooking chamber 3, so that the portion of cooked food pieces can be dispensed from the cooking chamber 3 to the water removal chamber 8. The water removal chamber 8, which serves to remove water from the portion of cooked food pieces, is arranged beneath the cooking chamber 3. The cooking chamber 3 and the water removal chamber 8 are connected to one another in a closable manner via the closable cooking chamber outlet 6. A wastewater outlet 9 for discharging hot wastewater from the water removal chamber 8 is arranged in the base of the water removal chamber 8. The base of the water removal chamber 8 is formed by a third closure 11 which is in the form of a closing flap which can be moved linearly. A lower water removal chamber outlet 10 can be closed by means of the closure 11. The portion of cooked food pieces, from which water has been removed, can be dispensed by opening the third closure 11. The heating chamber 12 is arranged all around the cooking chamber 3 in the form of an annular gap. A heating unit 13 is integrally cast in the partition wall between the heating chamber 12 and the cooking chamber 3, it being possible for said heating unit to heat both the cooking chamber 3 and the heating chamber 12. The heating chamber 12, the cooking chamber 3 and the heating unit 13 form a common cast part.

The fresh water tank 14 for accommodating fresh water, which is supplied by a fresh water line L1, is arranged at a distance from said common cast part. The fresh water tank 14 is arranged in the wastewater tank 15 and is surrounded by the wastewater tank 15 both all around, that is to say in the horizontal plane, and at the base. Therefore, the wastewater tank 15 and the fresh water tank 14 border one another in such a way that the fresh water in the fresh water tank 14 can be preheated by hot wastewater in the wastewater tank 15. The fresh water tank 14 is connected to the heating chamber 12 via a fresh water pump P1, so that the heating chamber 12 can be filled with fresh water. The heating chamber 12 is, in turn, connected to the cooking chamber 3, so that the cooking chamber 3 can be filled with preheated fresh water from the heating chamber 12. The wastewater outlet 9 of the water removal chamber 8 leads to the wastewater tank 15, so that hot wastewater from the water removal chamber 8 can be accommodated in the wastewater tank 15. The volume of the fresh water tank 14 corresponds at least to the volume of fresh water which is required for preparing at least one portion of food pieces. The volume of the wastewater tank 15 is of such a magnitude that at least the wastewater, which is produced during the preparation of a portion of food pieces, from the water removal chamber 8 can be accommodated. In addition, the volume of the wastewater tank 15 is greater than the volume of the fresh water tank 14. The volume of the heating chamber 12 is, in turn, greater than the volume of the cooking chamber 3.

The interaction between said components and the further features are described in the text which follows with reference to the preparation of a portion of food pieces:

The fresh water tank 14 is filled with fresh water via the fresh water line L1 by opening a switchable fresh water valve Y5. The main valve Y9 in the fresh water line L1 is open at least while the fresh water tank 14 is being filled and during the quenching process and, for safety reasons, is preferably closed in the normal state. The fresh water tank 14 is filled by virtue of the water pressure from the fresh water line L1. During filling, the filling level in the fresh water tank 14 is detected by means of the fresh water filling level measuring device V3. When a setpoint level for the fresh water in the fresh water tank 14 is reached, filling is stopped, via a signal from the fresh water filling level measuring device V3, by closing the fresh water valve Y5.

The heating chamber 12 is then filled with fresh water from the fresh water tank 14 by the fresh water pump P1 pumping the fresh water from the fresh water tank 14, via the line L2 and the open valve Y8, through the fresh water inlet 24, into the heating chamber 12.

The fresh water in the heating chamber 12 is preheated by activating the heating unit 13. The pressure in the heating chamber 12 is monitored by the pressure sensor V2 of the heating chamber 12 at the upper heating chamber pressure outlet 18. The pressure sensor V2 is set, for example, to 5 bar. As soon as this pressure is exceeded in the heating chamber 12, the valve Y11 in the line L7 opens and the excess pressure and steam passes from the heating chamber 12, through the lines L7 and L8, into the wastewater tank 15 and heats said wastewater tank. In order to prevent hot steam unnecessarily escaping from the heating chamber 12 into the wastewater tank 15, the heating unit 13 is preferably controlled or the temperature of said heating unit is regulated in such a way that the pressure in the heating chamber 12 does not exceed the limit pressure of the pressure sensor V2 under normal circumstances. As soon as a minimum temperature, which is regulated, in particular, by virtue of a temperature sensor which is not illustrated, is reached in the heating chamber 12, the apparatus is ready to operate.

As soon as a portion is required, a portion of uncooked food pieces is removed from the storage container 1 by means of the portioning apparatus 2. The cooking chamber 3 is charged with this portion of uncooked food pieces via the open first closure 5 of the upper cooking chamber inlet 4 by means of the portioning apparatus 2. In the meantime, the lower cooking chamber outlet 6 is closed by the second closure 7 being in the closed position. The portion of uncooked food pieces is now located in the dry cooking chamber 3. The first closure 5 of the upper cooking chamber inlet 4 is closed in a leak-tight manner. Atmospheric pressure still prevails in the cooking chamber 3.

The valve Y1 in the line L3, which connects the upper region of the heating chamber 12 to the lower region of the cooking chamber 3, is then opened, while at the same time the pump P1 for refilling the heating chamber 12 with fresh water from the fresh water tank 14 via the line L2 is activated. The pressurized hot fresh water from the upper region of the heating chamber 12 passes from the heating chamber 12 into the lower region of the cooking chamber 3 in which a significantly lower pressure prevails than in the heating chamber 12. The portion of uncooked food pieces is flooded with the hot water. As soon as the filling level of the hot fresh water in the cooking chamber 3 has reached a specific level, for example after a specific time has elapsed, the valve Y1 is closed again. It has proven advantageous to remove the preheated fresh water from the upper region of the heating chamber 12 and to supply the fresh water to the lower region of the heating chamber 12 in order to achieve temperature layering in the stored water in the heating chamber 12 and to convey water, which is as hot as possible, from the heating chamber 12 to the cooking chamber 3.

This is followed by the cooking process, during which the portion of food pieces in the cooking chamber 3 is cooked in hot water. In order to keep the water at the setpoint temperature or to raise it to the setpoint temperature, the cooking chamber 3 is supplied with heat by means of the heating unit 13 during the cooking process. Since the heating unit 13 also acts on the heating chamber 12, it additionally heats the water, which is cooled by the fresh water supply means, in the heating chamber 12 to the setpoint temperature at the same time. The pressure in the cooking chamber 3 is monitored by the pressure sensor V1 during the cooking process, with the pressure being limited or regulated, for example, at a maximum pressure, for example 2 bar, by virtue of pressure being released into the wastewater tank 15 via the cooking chamber pressure outlet 19 and the line L6 by opening the valve Y2, and/or the heating unit 13 is deactivated or the heating power is reduced. The wastewater tank is further heated by releasing pressure and hot steam into the wastewater tank 15 via the line L6. For safety reasons, a safety valve Y10 is provided in the line L3, which connects the heating chamber 12 and the cooking chamber 3, at the outlet of the heating chamber 12, said safety valve allowing pressure to pass from the heating chamber 12, via the line L8, into the wastewater tank 15 when an excessive limit pressure, for example of 9 bar, is reached.

During the cooking process or at the end of the cooking process, the pressures in the cooking chamber 3 and in the water removal chamber 8 are compensated by a valve Y3 in a line L10 which connects the cooking chamber 3 and the water removal chamber 8 being opened and the excess pressure escaping from the cooking chamber 3 to the water removal chamber 8. Pressure equalization is achieved between these two chambers 3 and 8.

The second closure 7 is now opened, so that the portion of cooked food pieces, together with the hot water from the cooking chamber 3, falls through the lower cooking chamber outlet 6 into the water removal chamber 8. In the meantime, the lower water removal chamber outlet 10 is closed by means of the third closure 11.

The portion of cooked food pieces is now freed of the excess water, in particular the cooking water, by the hot wastewater being discharged from the water removal chamber 8. To this end, the water removal chamber 8 has, at the base, the wastewater outlet 9 for discharging the hot wastewater from the water removal chamber 8. The wastewater outlet 9 leads to the wastewater tank 15 via the line L4 and the valve Y6, so that all the hot wastewater runs from the water removal chamber 8 to the wastewater tank 15 by opening the valve Y6. Any possible excess pressure or steam in the water removal chamber 8 passes into the wastewater tank 15 via the water removal chamber pressure outlet 17 and the line L5 and heats the interior of said wastewater tank. As an alternative, a valve can be arranged in the line L5 in order to control the pressure compensation between the water removal chamber 8 and the wastewater tank 15 in a deliberate manner. If there is no valve in the line L5, the excess pressure in the water removal chamber 8 also passes into the wastewater tank 15 at around the same time as pressure equalization is established between the cooking chamber 3 and the water removal chamber 8 via the line L10. After the wastewater is released through the line L4 and the excess pressure is likewise released through the line L4 and also through the line L5, atmospheric pressure prevails in the water removal chamber 8 since the wastewater tank 15 is a ventilated wastewater tank 15 in which no excess pressure prevails. The wastewater, which is at temperatures of up to 100 degrees Celsius, in the wastewater tank 15 initially remains there and surrounds the cooler fresh water in the fresh water tank 14. Since the wastewater tank 15 and the fresh water tank 14 adjoin one another in such a way that thermal compensation takes place between the contents of the fresh water tank 14 and the contents of the wastewater tank 15, the fresh water in the fresh water tank 14 is heated by the hot wastewater in the wastewater tank 15 until the fresh water and the wastewater are at substantially the same temperature.

Whereas the food pieces are located in the water removal chamber before, during and after the wastewater is discharged, in a further step, the portion of cooked food pieces from which water has been removed or from which water is to be removed, are quenched by said food pieces being sprayed with cold water. To this end, a quenching nozzle 23 is arranged in an upper section of the water removal chamber 8, the cold fresh water being uniformly distributed over the food pieces by means of said quenching nozzle. The quenching nozzle 23 is connected to the fresh water line L1 via the line L11 and the quenching nozzle valve Y4, so that unpreheated fresh water is sprayed onto the food pieces when the quenching nozzle valve Y4 is opened. This water is likewise heated by the hot food pieces and flows through the wastewater outlet 9 and the line L4 into the wastewater tank 15.

The portion of cooked food pieces from which water has been removed and which have been quenched can now be dispensed, by virtue of opening the third closure 11 of the lower water removal chamber outlet 10, by the portion falling onto a plate or a bowl (not illustrated) which is arranged beneath the water removal chamber outlet 10. A vacuum may be briefly created in the water removal chamber 8 on account of the food pieces falling through the water removal chamber outlet 10. In order for the food pieces to nevertheless be able to fall out of the water removal chamber without obstruction, a valve Y12 is provided in a top section of the water removal chamber 8, said valve forming an air inlet.

In the meantime, the hot wastewater in the wastewater tank 15 heats the fresh water in the fresh water tank 14. The wastewater temperature is measured by means of a wastewater temperature measuring device T1. In addition, the fresh water temperature is detected via the fresh water temperature measuring device T2. The time at which the temperatures have substantially equalized can therefore be identified. If this is the case or if the level of the wastewater in the wastewater tank 15, which level is detected by means of the wastewater filling level measuring device V5, has reached a specific filling level, the wastewater pump P2, which forms the wastewater tank outlet, is activated, as a result of which the cooled wastewater passes via the wastewater line L12 and, in particular, is supplied to the sewage system. The invention also makes provision for the wastewater filling level measuring device V5, the wastewater temperature measuring device T1, the wastewater tank outlet P2, the fresh water filling level measuring device V3, the fresh water temperature measuring device T2 and the fresh water tank inlet Y5 to be interconnected in such a way that the quantity of fresh water in the fresh water tank 14 is dependent on the quantity of wastewater in the wastewater tank 15 and/or the wastewater temperature and/or the fresh water temperature, and/or that the quantity of wastewater in the wastewater tank 15 is dependent on the quantity of fresh water in the fresh water tank 14 and/or the fresh water temperature and/or the wastewater temperature.

In order to additionally be able to preheat the fresh water in the fresh water tank 14, a fresh water heating element 16 is provided in the fresh water tank 14. This fresh water heating element 16 is activated particularly when the wastewater cannot heat the fresh water to a sufficient degree, for example because no hot wastewater is stored in the wastewater tank 15 or the wastewater has cooled down. In order to prevent the cold wastewater in the wastewater tank 15 being indirectly heated by the fresh water in the fresh water tank 14 being heated by the fresh water heating element 16, the invention also makes provision for the wastewater pump P2 to be activated in order to empty the wastewater tank 15 when the fresh water heating element 16 is activated.

All the valves may be in the form of switchable valves, in particular electrically operable solenoid valves or hydraulically switchable valves.

In order to prevent accidents and water damage, a water collection tray 22 is located beneath the cooking chamber 3, the heating chamber 12, the water removal chamber 8, the fresh water tank 14 and the wastewater tank 15. In order to detect any water which may be present in the water collection tray 22, a water collection tray filling level measuring device V6 is provided, said water collection tray filling level measuring device being interconnected with the main valve Y9 in the fresh water line L1 in such a way that the supply means for fresh water is switched off by closing the main valve Y9 in the fresh water line L1 when a limit value for the quantity of water in the water collection tray 22 is exceeded. In order to prevent the fresh water tank 14 from overflowing, an emergency cutout fresh water filling level measuring device V4 is also arranged in the fresh water tank 14. The main valve Y9 in the fresh water line L1 is switched off when a limit value for the filling level in the fresh water tank 14 is reached.

A further safety-relevant advantage of the invention is that all the wastewater and pressure outlets of the chambers are routed into the closed wastewater tank 15 or into the wastewater line L12. If steam actually leaks, since one of the valves is open, this hot steam flows, in the first instance, into the wastewater tank and can cool down there. Therefore, the risk of burns is considerably reduced.

In order to switch the apparatus to a safe operating state in the event of an unexpected power outage, the invention makes provision for the valves Y2, Y6 and Y11 to be in the form of so-called NO valves which are open in the inoperative state. In the event of a power outage, any possible excess pressure escapes from the heating chamber 12, the cooking chamber 3 and the water removal chamber 8 and any possible wastewater in the water removal chamber 8 passes into the wastewater tank 15 without creating a hazard.

The invention claimed is:

1. An apparatus for cooking portioned food pieces in batches, comprising:
    a storage container for accommodating the uncooked items of food to be cooked;
    a portioning apparatus for removing a portion of uncooked food pieces from the storage container;
    a cooking chamber for cooking the portion of uncooked food pieces, having
        an upper cooking chamber inlet, which can be closed by means of a first closure, for charging the cooking chamber with the portion of uncooked food pieces, and
        a lower cooking chamber outlet, which can be closed by means of a second closure, for dispensing the portion of cooked food pieces;
    a water removal chamber, which is arranged beneath the cooking chamber, for removing water from the portion of cooked food pieces, it being possible for the cooking chamber and the water removal chamber to be connected to one another via the closable cooking chamber outlet, having
        a wastewater outlet, which is arranged in the base of the water removal chamber, for discharging hot wastewater from the water removal chamber and
        a lower water removal chamber outlet, which can be closed by means of a third closure, for dispensing the portion of cooked food pieces from which water has been removed;
    a heating chamber separated from the cooking chamber;
    a fresh water tank, separated from the heating chamber, for accommodating fresh water for preparing at least one portion of food pieces, with the fresh water tank being connected to the heating chamber in order to fill said heating chamber with fresh water and with the heating chamber being connected to the cooking chamber in order to fill said cooking chamber with preheated fresh water, wherein a volume of the fresh water tank is greater than a volume of the heating chamber;
    a wastewater tank, to which the wastewater outlet is connected, for accommodating the hot wastewater from the water removal chamber, with a volume of the wastewater tank being of such a magnitude that at least the wastewater which is produced during the preparation of a portion of food pieces can be removed from the water removal chamber, and the wastewater tank and the fresh water tank are configured to allow the fresh water in the fresh water tank to be preheated by the hot wastewater in the wastewater tank a fresh water heating element in the fresh water tank for preheating the fresh water;

a wastewater temperature measuring device for detecting the wastewater temperature in the wastewater tank;

a wastewater filling level measuring device for detecting the quantity of wastewater in the waste water tank;

a fresh water filling level measuring device for detecting the quantity of fresh water in the fresh water tank;

a switchable wastewater tank outlet for switchably expelling the wastewater from the wastewater tank; and a fresh water tank inlet for switchably admitting fresh water into the fresh water tank and, with the wastewater temperature measuring device, the wastewater filling level measuring device, the wastewater tank outlet, the fresh water filling level measuring device, the fresh water tank inlet being configured so that the quantity of fresh water in the fresh water tank or the quantity of wastewater in the wastewater tank is dependent on the wastewater temperature in the wastewater tank.

2. The apparatus according to claim 1, wherein the volume of the fresh water tank corresponds at least to the volume of fresh water which is sufficient for preparing at least one portion of food pieces, and the volume of the wastewater tank is greater than the volume of the fresh water tank.

3. The apparatus according to claim 1, wherein the wastewater tank surrounds the fresh water tank at least in one plane, or vice versa.

4. The apparatus according to claim 3, wherein the fresh water tank is arranged in the wastewater tank and is substantially surrounded by the wastewater tank, or vice versa.

5. The apparatus according to claim 1, wherein the wastewater filling level measuring device, the wastewater tank outlet, the fresh water filling level measuring device and the fresh water tank inlet are configured so the quantity of fresh water in the fresh water tank is dependent on the quantity of wastewater in the wastewater tank.

6. The apparatus according to claim 1, wherein the quantity of fresh water in the fresh water tank and the quantity of wastewater in the wastewater tank is dependent on the wastewater temperature in the wastewater tank.

7. The apparatus according to claim 5, wherein the quantity of fresh water in the fresh water tank increases as the quantity of wastewater increases or as the wastewater temperature increases.

8. The apparatus according to claim 5, wherein the fresh water heating element and the wastewater tank outlet are interconnected in such a way that the quantity of wastewater in the wastewater tank is reduced when the fresh water heating element is switched on.

9. The apparatus according to claim 1, wherein the water removal chamber has a water removal chamber pressure outlet this water removal chamber pressure outlet being connected to the wastewater tank in order to expel pressure from the water removal chamber and into the wastewater tank before the third closure is opened, or the heating chamber has a heating chamber pressure outlet which is connected to the wastewater tank or a wastewater line in order to expel pressure from the heating chamber and into the wastewater tank or into the wastewater line, being interconnected to a pressure sensor, which detects the pressure in the heating chamber, in such a way that the pressure in the heating chamber is regulated, or the cooking chamber has a cooking chamber pressure outlet which is connected to the wastewater tank or a wastewater line in order to expel pressure from the cooking chamber with the valve being interconnected to a pressure sensor, which detects the pressure in the cooking chamber, in such a way that the pressure in the cooking chamber is regulated.

10. The apparatus according to claim 1, further comprising:

a water collection tray beneath the cooking chamber, the heating chamber, the water removal chamber, the fresh water tank and the wastewater tank, a water collection tray filling level measuring device for detecting a quantity of water in the water collection tray, and a main valve in the supply means for the fresh water, with the water collection tray filling level measuring device and the main valve being formed and interconnected in such a way that the supply means for fresh water is switched off when a limit value for the quantity of water in the water collection tray is exceeded.

11. The apparatus according to claim 1, wherein a quenching nozzle for quenching the portion of cooked food pieces, from which water has been removed, with fresh water is arranged in the water removal chamber, wherein the quenching nozzle is connected to a fresh water supply which is connected upstream of the fresh water tank, via a quenching nozzle valve.

12. The apparatus according to claim 1, wherein the heating chamber is arranged all around the cooking chamber, with a heating unit for heating the cooking chamber and the heating chamber being arranged in the partition wall between the heating chamber and the cooking chamber.

13. The apparatus according to claim 1, wherein the volume of the heating chamber is greater than the volume of the cooking chamber.

14. The apparatus according to claim 8, wherein there is essentially no wastewater in the wastewater tank.

15. The apparatus of claim 1, wherein the fresh water supplied to the heating chamber includes one of enriched water, aromatized water, broth, stock, sauce, juice, and fat.

* * * * *